No. 737,372. PATENTED AUG. 25, 1903.
F. DUPRAS.
RUNNER ATTACHMENT FOR BICYCLE FRAMES.
APPLICATION FILED APR. 11, 1903.
NO MODEL.
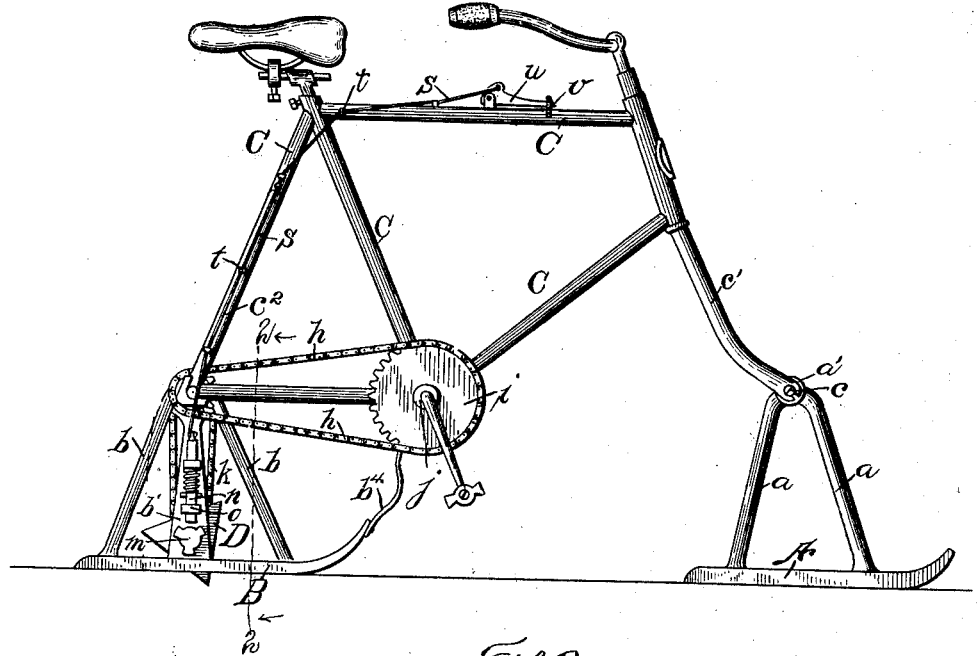
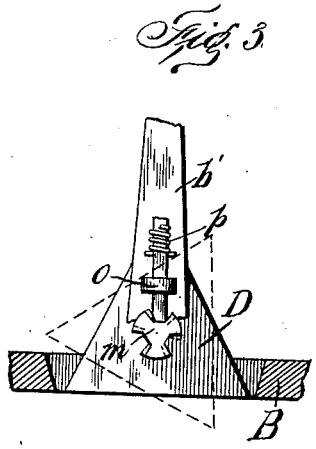
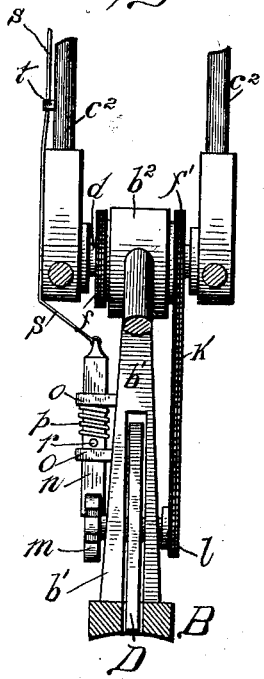
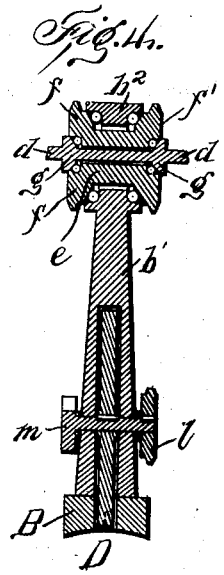
WITNESSES:
Wm. C. McKenzie
Amos W. Hall
INVENTOR
Fredrick Dupras.
BY Munn & Co.
ATTORNEYS.

No. 737,372. Patented August 25, 1903.

UNITED STATES PATENT OFFICE.

FREDERICK DUPRAS, OF MARQUETTE, MICHIGAN.

RUNNER ATTACHMENT FOR BICYCLE-FRAMES.

SPECIFICATION forming part of Letters Patent No. 737,372, dated August 25, 1903.

Application filed April 11, 1903. Serial No. 152,176. (No model.)

*To all whom it may concern:*

Be it known that I, FREDERICK DUPRAS, a citizen of the United States, and a resident of Marquette, in the county of Marquette and State of Michigan, have made certain new and useful Improvements in Runner Attachments for Bicycle-Frames, of which the following is a specification.

It is the object of my invention to provide an improved runner attachment for the ordinary bicycle-frame, the attachment including a driving mechanism which is operated by the ordinary chain-and-sprocket gear employed on bicycles.
The details of construction, arrangement, and combination of parts are as hereinafter described, reference being had to accompanying drawings, in which—

Figure 1 is a side view of a bicycle-frame provided with my improved attachment. Fig. 2 is an enlarged transverse vertical section on the line 2 2 of Fig. 1. Fig. 3 is a detail view illustrating the lock of the propelling-wheel. Fig. 4 is an enlarged cross-section of the rear runner and attachments.

In the drawings, A indicates the front runner, and B the rear runner, of my improved attachment, the same being each formed of a steel bar, which is bent slightly upward at the front end and preferably grooved longitudinally. The front runner A has two inclined legs or posts $a$, which are provided at their upper ends with a hub $a'$, through which passes an axle $c$, whereby the runner is duly connected with the front fork $c'$ of the bicycle-frame C. In practice the ends of the fork $c'$ will fit in socket-pieces and the cylindrical portions of the axle pass through both parts, the portion passing through the hub $a'$ being square. The runner A is thus adapted to oscillate in a vertical plane and turn laterally with the front fork in the same manner as the wheel usually employed in its place.

The rear runner B is similar to the front one in so far as relates to the inclined legs or posts $b$. It has in addition a central vertical post or leg $b'$, whose upper end $b^2$ (see Fig. 2) is enlarged and bored to adapt it to receive and support the rotatable hub of the rear axle $d$. The latter is suitably held in the rear fork $c^2$ of the frame C in such manner that it cannot rotate. Upon said axle is mounted a loose or rotatable sleeve or hub $e$, having two sprocket-wheels $f$ and $f'$ secured on its respective ends. Between the runner-hub $b^2$ and sprockets $f f'$ antifriction-balls are provided and also between the rotatable hub or sleeve $e$ and the axle $d$, as shown in Fig. 4. The friction due to oscillation of the rear runner B on the loose hub $e$ and of the latter on the fixed axle $d$ is thus reduced to a minimum. As shown in Fig. 1, a chain $h$ runs from the left-hand sprocket $f$ to a larger one $i$, which is keyed on the driving-axle $j$, to which cranks bearing pedals are applied in the usual way. Ball-bearings are provided for the driving-axle in the frame-hanger in the usual way.

The means for propelling the bicycle with the runner above described are as follows: A toothed or spur wheel D is arranged in a vertical slot in the rear runner B and the central post $b'$, the toothed portion of said wheel projecting below the runner proper, so as to take into the ice or snow surface on which the attachment is used. This propelling-wheel is preferably triangular in shape, as shown. The axle of said spur-wheel D is journaled in the central post $b'$ near the runner B. A chain is run from sprocket-wheel $f'$ of the rotating hub $e$ to a smaller wheel $l$, keyed upon the axle of spur-wheel D, and it is hence apparent that the latter is driven from the crank-shaft $j$ on the end of the axle of wheel D. Opposite the sprocket-wheel $l$ is keyed a notched wheel $m$, with which a slidable pawl $n$ is adapted to engage for the purpose of locking the spur-wheel D, as hereinafter described. The said pawl $n$ slides in keepers $o$, projecting from the side of the vertical post $b'$, and a spiral spring $p$ is arranged between said keepers, as shown in Fig. 2. The pawl $n$ is also provided with a cross-pin $r$ for limiting the downward movement of the spring. The pawl is square in cross-section, so that it cannot rotate in the keepers. A cord or strap $s$ is attached to the upper end of the pawl and extends through suitable guides $t$ to a lever $u$, which is pivoted on the top bar of the bicycle-frame C. When the lever $u$ is thrown down and secured by suitable fastening $v$, as shown in Fig. 1, the pawl $n$ is raised out of engagement with the toothed wheel $m$, and the spur-wheel D is thus left free to rotate for driving the sled. Upon releasing the lever $u$ the expansion of the spring $p$ throws the pawl down into engagement with the toothed wheel $m$, whereby the spur-gear D is locked, so that it cannot rotate. The arrangement of the notches in wheel $m$ with relation to the three sides of the spur-wheel D is such that whenever the pawl is engaged with the wheel $m$ one of the sides of the spur-wheel D is flush with the end surface of the runner B. In this position the attachment is properly adjusted for coasting. It will be understood that in order to again propel the sled the lever $u$ must be thrown down and secured, as in Fig. 1, for the purpose of releasing the lock of the spur-wheel D and leaving the latter free to rotate.

A strap $b^4$ (see Fig. 1) connects the front end of the rear runner B with the bicycle-frame, and thus serves as a guard, limiting the oscillation of the runner within the limits of safety.

Having thus described my invention, what I claim as new, and desire to secure by Letters Patent, is—

1. The combination with a bicycle-frame having front and rear axles and a driving crank-shaft, of front and rear runners journaled and adapted to oscillate in the front and rear forks, the rear runner having a vertical slot, a spur driving-wheel journaled in the slot and having a sprocket-wheel keyed on its axle, a hub journaled on the rear axle, and having two sprocket-wheels, a third sprocket-wheel keyed on the crank-shaft of the frame, and chains connecting the several sprockets, substantially as shown and described.

2. The combination with the bicycle-frame and the usual driving mechanism comprising the crank-shaft, sprocket-wheel and chain, of the rear-runner attachment hereinbefore described comprising an axle fixed in the rear fork, a hub journaled on said axle and provided with sprocket-wheels, the runner-post having an enlarged cylindrical head, and antifriction-balls between the same and the aforesaid hub and in the space between the latter and the axle, a toothed driving-wheel journaled on the runner proper, a sprocket-wheel which is fast with said driving-wheel, and a chain extending therefrom to one of the sprockets of the said hub, substantially as shown and described.

3. The combination with the rear runner of the spur-wheel journaled thereon in a vertical plane and means for rotating the same, the said spur-wheel having three plane sides, a toothed wheel keyed upon the axle of said spur-wheel, a locking device adapted to engage said toothed wheel and means for releasing the lock.

4. The combination, with a suitable frame, and a rear runner adapted to oscillate in said frame, of a triangular propelling-wheel which is journaled in connection with said runner, a toothed wheel which is fast with said propelling-wheel, a slidable pawl adapted to engage the toothed wheel, a spring applied to the said pawl, and means under the control of the operator for raising the pawl out of engagement with the toothed wheel, substantially as shown and described.

5. The combination, with a suitable frame and a runner connected therewith, of a polygonal propelling-wheel journaled on said runner, means for rotating said propelling-wheel, and means for locking it with one of the sides parallel with the under surface of the runner, substantially as shown and described.

FREDERICK DUPRAS.

Witnesses:
JAMES DWYER,
JAS. J. DONOVAN.